United States Patent
Lane et al.

(10) Patent No.: US 7,572,056 B2
(45) Date of Patent: Aug. 11, 2009

(54) PROBE COVER FOR THERMOMETRY APPARATUS

(75) Inventors: John A. Lane, Weedsport, NY (US);
David S. Young, Marcellus, NY (US);
David E. Quinn, Weedsport, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 458 days.

(21) Appl. No.: 10/989,631

(22) Filed: Nov. 16, 2004

(65) Prior Publication Data

US 2006/0106365 A1 May 18, 2006

(51) Int. Cl.
*G01K 1/08* (2006.01)
(52) U.S. Cl. ........................ 374/158; 374/209
(58) Field of Classification Search ............... 374/209, 374/158, 163; 702/131
See application file for complete search history.

(56) References Cited

U.S. PATENT DOCUMENTS

| | | | | |
|---|---|---|---|---|
| 1,363,259 A | | 12/1920 | Mills | |
| 3,703,892 A | * | 11/1972 | Meyers | 374/158 |
| 3,738,173 A | | 6/1973 | Sato | |
| 3,738,479 A | | 6/1973 | Sato | |
| 3,837,772 A | | 9/1974 | Van de Walker et al. | |
| 3,880,282 A | * | 4/1975 | Naumann | 374/209 |
| 3,999,434 A | * | 12/1976 | Yen | 374/158 |
| 4,008,614 A | * | 2/1977 | Turner et al. | 374/158 |
| 4,054,057 A | | 10/1977 | Kluge et al. | |
| 4,086,813 A | * | 5/1978 | Meek et al. | 338/28 |
| 4,112,762 A | * | 9/1978 | Turner et al. | 206/306 |
| 4,343,185 A | * | 8/1982 | Knute | 374/158 |
| 4,457,633 A | * | 7/1984 | Andrews | 374/209 |
| 4,588,306 A | | 5/1986 | Burger et al. | |
| 5,165,798 A | * | 11/1992 | Watanabe | 374/208 |
| 6,036,361 A | | 3/2000 | Gregory et al. | |
| 6,461,037 B1 | * | 10/2002 | O'Leary | 374/158 |
| 6,595,911 B2 | * | 7/2003 | LoVuolo | 600/30 |
| 2002/0172257 A1 | * | 11/2002 | Walls et al. | 374/158 |

OTHER PUBLICATIONS

International Search Report, Mailed May 4, 2006, (3 Pages), USA.

* cited by examiner

*Primary Examiner*—Lisa M Caputo
*Assistant Examiner*—Mirellys Jagan
(74) *Attorney, Agent, or Firm*—Hiscock & Barclay, LLP

(57) ABSTRACT

A disposable cover for an elongated probe of a portable thermometry apparatus includes an open proximal end and a distal tip sized to fit over at least an axial portion of the elongated probe. The cover includes a transitional wall thickness at its proximal end for fitting over a holding barb of said probe, the transitional wall thickness varying between a first wall thickness adjacent the proximal end and a second wall thickness that is substantially thinner than the first wall thickness at a distal axial distance relative to the proximal end. The second wall thickness defines a weakened wall portion which is ruptured when the cover has been ejected from said holding barb by an ejection mechanism of the thermometry apparatus. The cover can also include a thinned walled portion over at least a portion of the distal tip and can also include a feature that permits the user to detect when a cover has been attached to a probe.

38 Claims, 5 Drawing Sheets

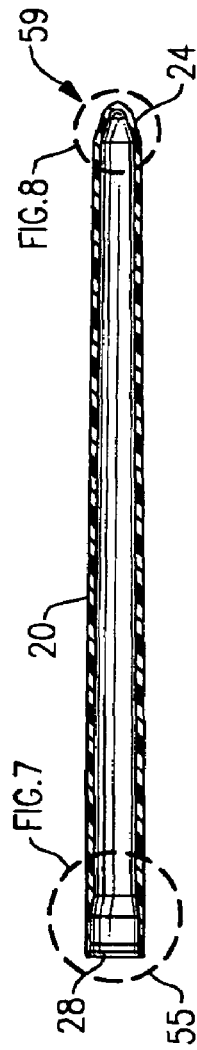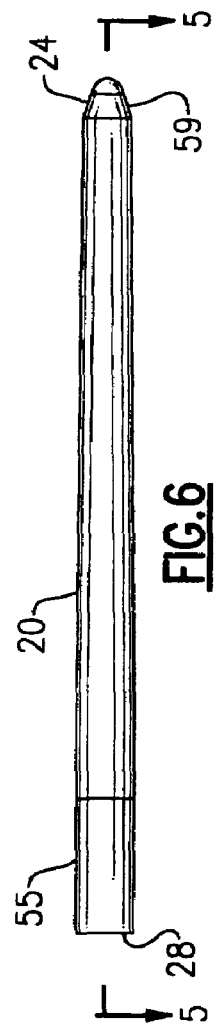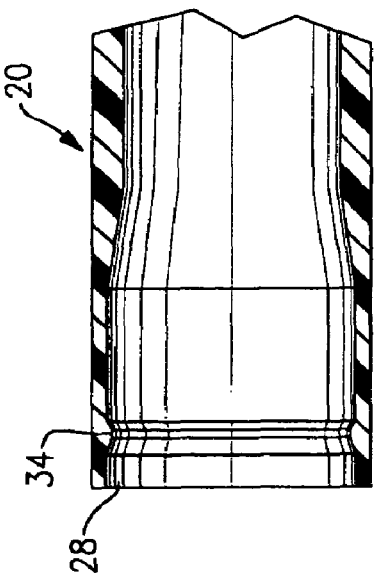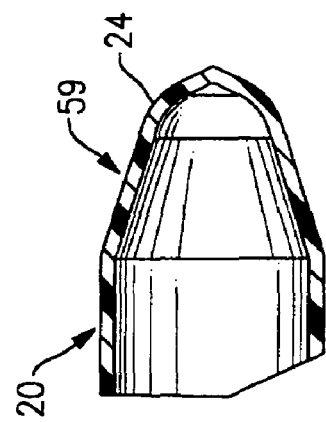

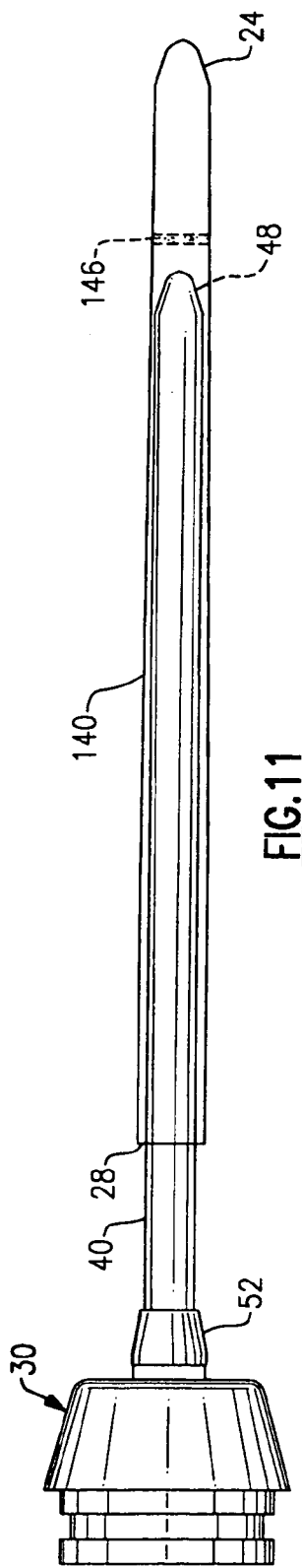
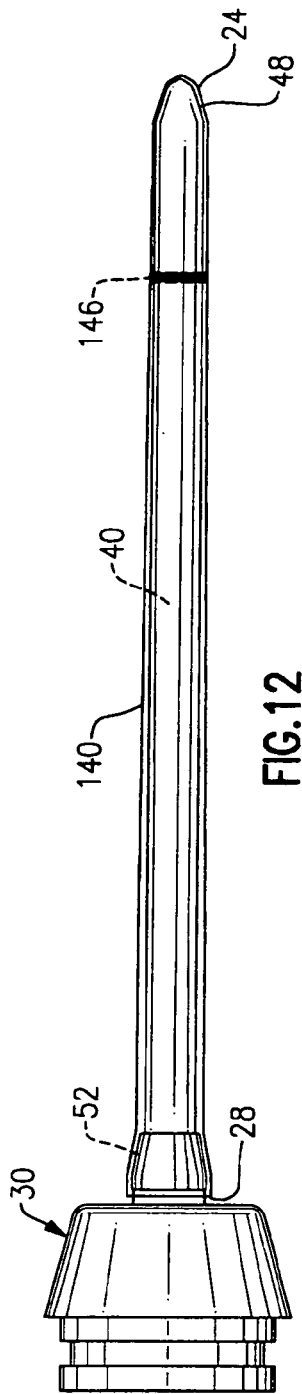
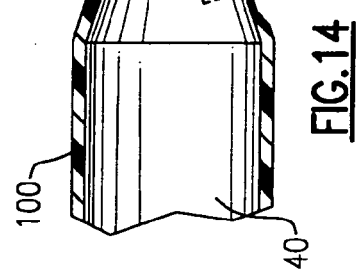
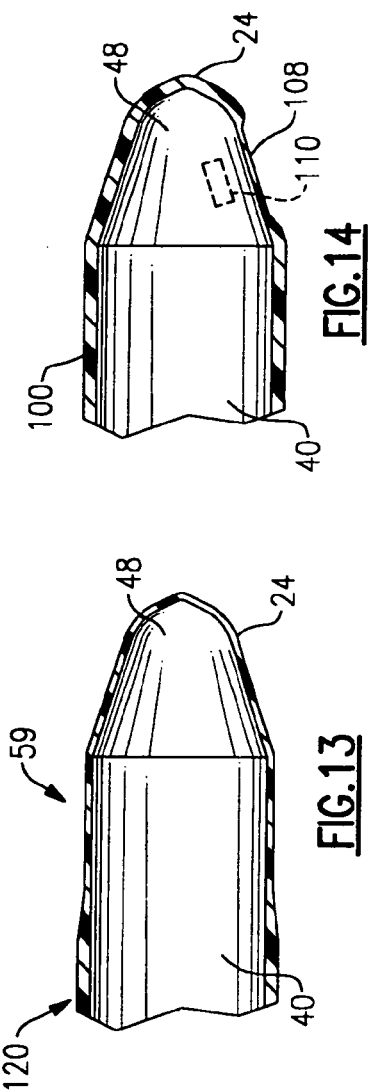

PROBE COVER FOR THERMOMETRY APPARATUS

FIELD OF THE INVENTION

This invention relates to the field of temperature measurement and in particular to a disposable probe cover for use with a medical thermometry apparatus.

BACKGROUND OF THE INVENTION

There are known instruments used in the medical field for determining the body temperature of patients. These instruments include typically an elongate probe that includes at least one temperature sensitive element that is disposed within the interior of the probe. The probe is inserted into a body site of interest, such as the axilla, the mouth, the ear, the rectum or other medical target and the temperature is determined through resident circuitry based on the output of the temperature sensitive element, whether a thermocouple, thermistor, or other suitable transducer.

In order to prevent contamination between patients, a flexible cover or sheath is usually disposed onto the exterior of the elongate probe. This cover is a hollow plastic member that is disposable and is formed from a plastic molded material. Usually, the covers are made from either an injection molding or a fusion molding process and include a generally constant wall thickness which includes a latching ring that is used to engage a holding barb of the probe at an open proximal end of the probe cover and an ejection mechanism is used to release the cover when a temperature measurement procedure is completed. An issue that is common in the field is that users, in spite of the ejection mechanism, must often handle the covers in order to fully remove them from the apparatus or rely upon gravity to insure removal. Unlike dental probes, for example, the thermometry probe cover is actually part of the device and is part of the temperature measurement procedure. In addition, temperature probe covers are required to have greater rigidity to prevent tearing or contamination, depending on the body site to be measured.

There is a further issue in that probe covers are typically fabricated with a fixed wall thickness which is required for adequate stiffness to prevent accidental tearing, yet are adequately stiff to permit the probe to be pushed into the interior of the cover, having the cover engage with the probe and not ruin the probe cover. However, this factor produces additional thermal resistance in terms of measuring temperature in that the probe cover is disposed between the target of interest and the temperature sensing element of the apparatus.

There is a need in the field to devise a temperature probe cover which is more responsive to permit temperature readings to be taken without sacrificing time based on the differences between the thermal characteristics of the cover and the temperature probe.

There is a further need to provide a cover that does not require the user to have to handle the cover in order to remove the cover from the temperature measuring apparatus, therefore decreasing the chances for contamination.

There is yet a further need in the field to provide a temperature probe cover that does not permit reuse thereof after the cover has been used in connection with a temperature measurement procedure.

SUMMARY OF THE INVENTION

It is therefore a primary object of the present invention to overcome the above-noted deficiencies of the prior art.

It is therefore another primary object of the present invention to provide a temperature probe cover that is incapable of being reused; that is, the cover permits only single use or single patient use.

It is yet another primary object of the present invention to provide a temperature probe cover that permits temperature measurements to be made more efficiently and effectively than using previously known probe covers constructed for this purpose.

It is yet another primary object of the present invention to provide probe covers for a thermometry apparatus that provide additional utility and versatility than previously known in the field.

Therefore and according to one preferred aspect of the present invention, there is provided a disposable cover for a elongated probe of a portable thermometry apparatus, said probe including a holding barb at a proximal end thereof, said cover comprising a flexible sleeve member having an open proximal end and a distal tip sized to fit over at least an axial portion of said elongated probe, said cover including a transitional wall thickness at said proximal end for fitting over a holding barb of said probe, said transitional wall thickness varying between a first wall thickness adjacent said proximal end and a second wall thickness that is substantially thinner than the first wall thickness at a distal axial distance relative to said proximal end, said second wall thickness defining a weakened wall portion which is ruptured when said cover has been ejected from said holding barb by an ejection mechanism of said thermometry apparatus.

Preferably, the probe cover is fabricated from an injection molding process, but the cover can also be manufactured by other suitable techniques to create the desired geometry.

According to another preferred aspect of the present invention, there is provided a disposable cover for a elongated probe of a portable thermometry apparatus, said probe including a holding barb at a proximal end thereof, said cover comprising a flexible sleeve member having an open proximal end and a distal tip sized to fit over at least an axial portion of said elongated probe, said cover including a transitional wall thickness at said proximal end for fitting over a holding barb of said probe, said transitional wall thickness varying between a first wall thickness adjacent said proximal end and a second wall thickness that is substantially thinner than the first wall thickness at an axial distance distally located from said proximal end, said second wall thickness defining a weakened wall portion which is ruptured when said cover has been ejected from said holding barb by an ejection mechanism of said thermometry apparatus wherein the ejection mechanism of said apparatus includes means for supplying an axial force to the proximal end of said cover, wherein said weakened wall portion imparts a spring force to facilitate removal thereof when said axial force is supplied, and in which the diameter of said probe cover is sized to be less than that of the holding barb when attached thereto.

According to yet another preferred aspect of the present invention, there is provided a method of manufacturing a cover for an elongate probe of a thermometry apparatus, said elongate probe including a distal tip and an ejection mechanism that includes a retaining barb, said cover including a hollow sleeve member having a distal tip and an open proximal end that is fitted onto said elongate probe, said method including the steps of providing a cover with a distal tip and an open-ended proximal end sized for fitting over a said elongate probe; and providing a distally tapering transitional wall thickness at the proximal end of said cover, said distally tapering transitional wall thickness varying between a first wall thickness and a second wall thickness that is substantially thinner than said first wall thickness providing a weakened area that is ruptured when said ejection mechanism is used to eject a said cover from said probe.

According to still another preferred aspect of the present invention, there is provided a thermometry apparatus comprising an elongate probe tethered to a housing and having a holding barb disposed at a proximal end thereof; a disposable probe cover mounted onto the exterior of said elongate probe; and an ejection mechanism for releasing said disposable probe cover from said elongate probe wherein said cover includes a flexible sleeve member sized to fit over the length of said elongated probe and having a transitional wall thickness in the proximal end thereof for fitting over the holding barb of said probe, said transitional wall thickness varying between a first wall thickness and a second wall thickness which is thinner than the first wall thickness defining a weakened wall portion permitting said cover to be more easily removed by the ejection mechanism of said apparatus.

According to yet another preferred aspect of the present invention, there is provided a disposable probe cover for a thermometry apparatus, said probe cover comprising an open-ended proximal end and a distal tip, said cover being defined by a first wall thickness and a second wall thickness which is thinner than said first wall thickness wherein said second wall thickness is provided in the distal tip of said cover for engaging a distal end of an elongate probe of said thermometry apparatus, said distal tip of said elongate probe including at least one contained temperature measuring element wherein attachment of said probe cover provides a low resistance thermal conductive path relative to a target of interest.

According to still another preferred aspect of the present invention, there is provided a disposable cover for an elongated probe of a portable thermometry apparatus, said cover comprising a flexible sleeve member having an open proximal end and a distal tip sized to fit over at least an axial portion of said elongated probe and including a feature disposed within said cover for indicating said cover has been attached to a said probe.

One advantage realized by the present invention is that attachment of the cover will provide a suitable indication to the user that a probe cover has actually been attached to the exterior of the probe, thereby preventing use without a cover. Moreover, the means for indicating that the cover is attached can further include additional functional features, such as an insertion mark in the case of a rectal or similar probe. These features can be provided either on the probe itself or preferably on the interior of the disposable cover, wherein the identifying features can be molded or otherwise supplied.

Another advantage provided by the present invention is that attachment of the herein described probe cover to a thermometry apparatus can provide an indication of the body site to be measured. This indication is useful, for example, in the case of apparatus that utilize different measurement algorithms to determine temperature of the body site.

Yet another advantage of the present invention is that the herein described probe cover is permanently disabled when removed from the thermometry apparatus. As such, there is substantially less risk of contamination for the patient.

Yet still another advantage of the present invention is that the herein described probe cover further provides for increased versatility in the use of a thermometry apparatus than previously known in the field.

These and other objects, features, and advantages will become readily apparent from the following Detailed Description which should be read in conjunction with the accompanying drawings.

BRIEF DESCRIPTION OF THE DRAWINGS

FIG. 5 is a side view of the probe cover of FIGS. 3 and 4, shown in section;

FIG. 6 is the side view of the probe cover of FIGS. 3-5;

FIG. 7 is an enlarged view of the proximal end of the probe cover as highlighted in FIG. 5;

FIG. 8 is an enlarged view of the distal tip of the probe cover as highlighted in FIG. 5;

FIG. 11 is a side view of a probe cover in accordance with another embodiment of the invention as attached to a thermometry apparatus, partially shown;

FIG. 12 is a side view of the probe cover of FIG. 11 as assembled to the thermometry apparatus thereof;

FIG. 13 is an enlarged front view of a probe cover in accordance with another embodiment of the invention as attached to a thermometry probe; and FIG. 14 is an enlarged front view of a probe cover made in accordance with another embodiment of the invention as attached to a thermometry probe.

DETAILED DESCRIPTION

The following description relates to several embodiments for a disposable probe cover as used with a thermometry apparatus, as well as a thermometry apparatus that is configured to receive a probe cover in accordance with the present invention. Throughout the course of discussion which follows, several terms are used in order to provide a convenient frame of reference for the accompanying drawings. These terms, unless specifically indicated, are not intended to be limiting of the present invention.

Figure 1:
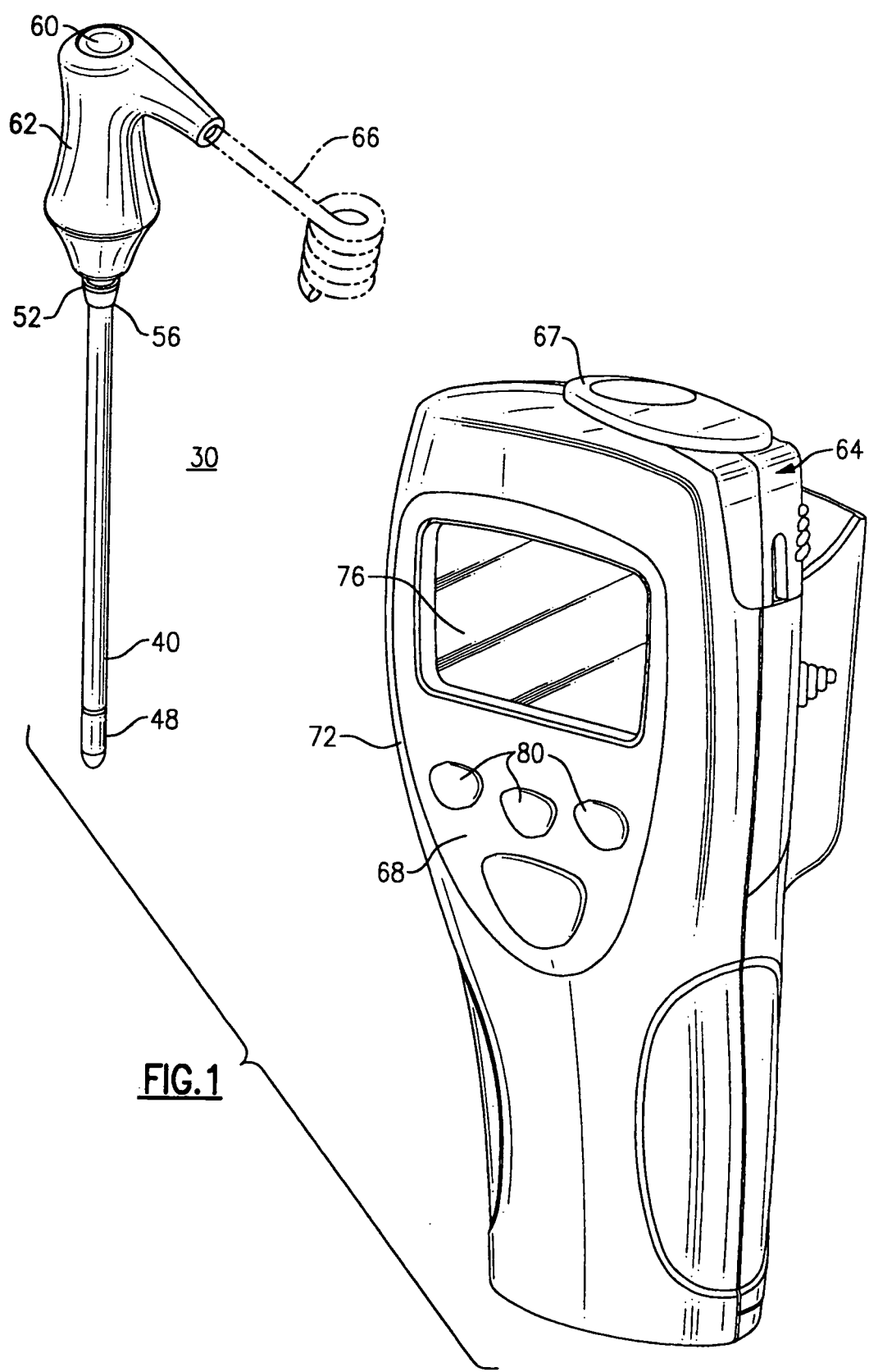
FIG. 1 is a front perspective view of a portable thermometry apparatus in accordance with the known art.

First and for purposes of background, the basic features and operation of a known thermometry apparatus will be described in brief. Referring to FIG. 1, the thermometry apparatus 30 includes an elongate probe 40 that is tethered to a housing 64. The elongate probe 40 is made from a stainless steel or other similar thermally conductive material and includes at least one temperature sensing element (not shown), such as a thermocouple or a thermistor, which is housed within a distal tip 48 thereof. The elongate probe 40 may also include a resistive or other heating element (not shown), also preferably housed in the distal tip 48 thereof, which produces pre-heating of the probe in order to acclimate same prior to any temperature measurement in order to hasten the overall measurement time. Such pre-heating elements and their operation are described in the field, for example in U.S. Pat. No. 6,036,361 to Gregory, the contents of which are herein incorporated in their entirety by reference. The probe 40 is a substantially cylindrical member that extends to a holding barb 52 at a proximal end 56 thereof. The probe 40 further includes a handle 62 at its proximal or upper end 56 in relation to the holding barb 52, wherein the handle includes a depressible button 60 which permits the holding barb to move relative to the attached probe cover, effecting release thereof, as part of an ejection mechanism. The depression of the button 60 causes an attached probe cover to be pushed off of the probe by moving the stainless steel shaft forward, causing the attached probe cover to be pushed beyond the holding barb 52. The probe cover is sized in terms of its length such that initial engagement of the cover with the probe 40 causes the stainless steel shaft to be pushed rearwardly, causing the button 60 to be pushed outwardly from the handle 62.

The housing 64 includes circuitry for processing a signal that is generated by a tethered probe 40, wherein the probe resides in a sealed removable isolation chamber 67 which is formed in the housing for retaining the probe when not in use. The elongate probe 40 is appropriately sized for insertion into a patient body site, such as the sublingual pocket, though other body sites of a patient can similarly be measured. The probe 40 is releasably connected in a manner to the housing 64 by means of a flexible electrical cord 66, shown only partially in phantom in FIG. 1. According to one version of a thermometry apparatus, as described in commonly assigned U.S. Ser. No. 10/683,206, filed Oct. 10, 2003, an EEPROM or other form of memory is included within a connector that releasably attaches to the housing 64. The EEPROM can include probe-specific data such as but not limited to pre-heating data, calibration coefficients, the type of probe (axillary, rectal, or other) used.

The housing 64 includes a user interface 68 on a front facing side 72 that includes a display 76 as well as a plurality of control buttons 80 for controlling the operation of the apparatus. The apparatus 30 is powered by a set of batteries (not shown) that are contained therein. The housing 64 further includes a microprocessor (not shown) that includes software for calculating temperature based upon the input from the temperature sensing element.

As to the operation of the apparatus 30 in accordance with the known art, the probe 40 is initially removed from the isolation chamber 57 by the user and a disposable probe cover is placed onto the exterior of the probe. The probe cover, being a hollow elongated member, is constructed to overlay the elongate probe, including the holding barb 52, so as to protect the probe from contamination, wherein a source of covers (not shown) can be provided in a receptacle 77 that is provided on the rear of the housing 64, FIG. 1. Currently, known probe covers do include a latch ring or annular retaining rib adjacent the proximal end of the cover. This retaining rib is caused to engage the holding barb and further due to the length differences between the shaft portion of the probe and the probe cover, engagement with same causes the shaft portion to be pushed rearwardly extending the button outwardly from the handle 62. The probe covers according to the known art, however, are manufactured with a substantially constant thickness in the proximal end that is being attached to the holding barb 52. The latter is indicative or as a result of the fabrication processes of the probe cover.

Removal of the probe 40 from the isolation chamber 57 automatically activates the apparatus 30, as described in greater detail in commonly assigned U.S. Ser. No. 10/379, 276, filed Mar. 4, 2003, the entire contents of which are herein incorporated by reference. Moreover, and assuming the electrical cable 66 is tethered to the housing 64, an EEPROM provided in the connector thereof (not shown) communicates with the microprocessor to automatically download probe-specific data to enable temperature measurement, correct probe pre-heating, and/or other processing specific tasks. The EEPROM or other from of memory can include calibration coefficients, pre-heating rise behavior data, and/or other probe specific data which can be used by the microprocessor, such as in a connector of the tethered cable 66. The probe 40 is then inserted into the body site of interest and the output of the temperature sensing element is communicated to the microprocessor, wherein the processed result is displayed to the user. Additional details concerning the calibration of the probe can be found in previously incorporated U.S. Ser. No. 10/683,206.

With the preceding background and referring to FIGS. 3-8, there is now described a disposable probe cover that is made in accordance with a preferred embodiment of the present invention. The probe cover 20 is an elongated hollow plastic member made from a low density polypropylene or other suitable material. According to the present embodiment, the cover 20 is fabricated from LLDPE and is structurally defined by an open proximal end 28 and an opposing distal tip 24. Preferably, the probe cover 20 is made from a fusion molding process, though the cover could also be fabricated from an injection molding or other suitable process. The probe cover 20 is appropriately sized in terms of its overall dimensions to be fitted over an elongate probe 40, FIG. 1, of a thermometry apparatus 30, such as those described above, among others. The thermometry apparatus 30 is also partially shown in FIGS. 2 and 3 for purposes of clarity.

Still referring to FIGS. 2-8, the probe cover 20 according to this embodiment is defined by a substantially constant wall thickness extending over substantially the majority of the axial portion of the cover, the latter being typically on the order of about four total inches in length in order to effectively cover the corresponding length of the elongate probe 40. A proximal attachment portion 55 extends approximately 0.250 inches from the proximal end 28 of the cover 20, the attachment portion having a variable wall thickness as will be described below. The wall thickness across the major axial portion of the probe cover 20 according to this embodiment is approximately 0.022-0.028 inches between the distal tip 24 of the probe cover and the proximal attachment portion 55.

As shown more clearly in FIG. 8, the distal tip 24 of the herein described probe cover 20 also includes a region 59 having a wall thickness which is thinner than that of the major axial portion of the cover. According to this embodiment, the distal tip region 59 has a wall thickness of about 0.010-0.016 inches, though this parameter can be suitably varied.

Referring more particularly to FIGS. 5 and 7, the interior wall thickness at the proximal attachment portion 55 of the probe cover 20 tapers inwardly from a first wall thickness of about 0.025 inches to a second wall thickness of about 0.010 inches, the wall thicknesses according to this embodiment having a variability of about 0.002 inches. Immediately adjacent the proximal end 28, the wall thickness is locally increased in order to provide an annular retaining rib 34 that is used to engage the rear edge 53 of the holding barb 52 of the thermometry apparatus 30.

Figure 3:
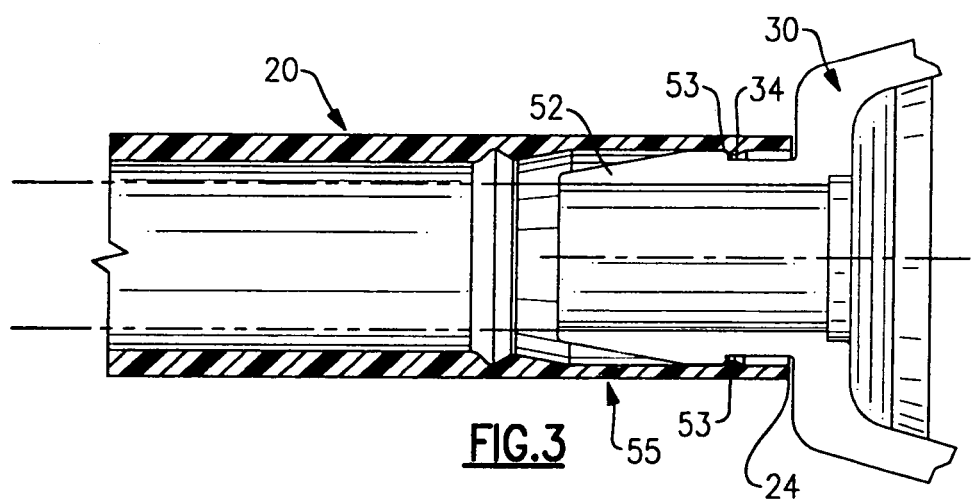
FIG. 3 is a partial side sectioned view of a probe cover made in accordance with another embodiment of the invention as attached to a thermometry apparatus prior to ejection thereof
Figure 4:
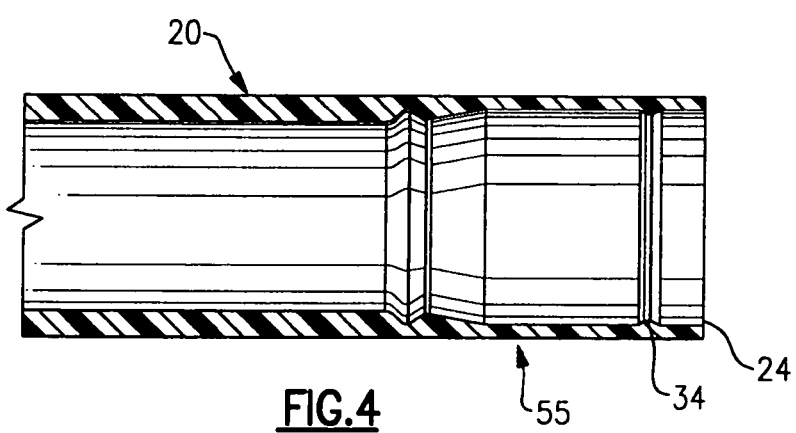
FIG. 4 is a partial side sectioned view of the probe cover of FIG. 3 with the probe cover as removed therefrom.

This overall reduction in wall thickness in the proximal attachment portion 55 permits the thinned portions of the herein described probe cover 20 to elastically deform in a radial direction when mounted onto the holding barb 52 of the thermometry apparatus 30 as shown in FIG. 3, wherein the resulting elastic deformation creates a storage of energy in the form of a created hoop stress component. Moreover, the thinned wall portion is structurally weakened, wherein the ejection mechanism of the thermometry apparatus 30, FIG. 1, when employed, ruptures the thinned wall portion.

In operation, the probe cover 20 is fitted onto the elongate probe 40 wherein the proximal end 28 and more particularly, the proximal attachment portion 55 is elastically fitted over the holding barb 52 when attached, as shown in FIG. 3, in which the retaining rib 34 engages the rear edge 53 of the barb and creates a spring force due to the elastic deformation that is created when the probe cover is attached. Following attachment of the probe cover 20, a temperature measuring procedure can then be performed on the patient using the apparatus 30 in accordance with known techniques.

Figure 2:
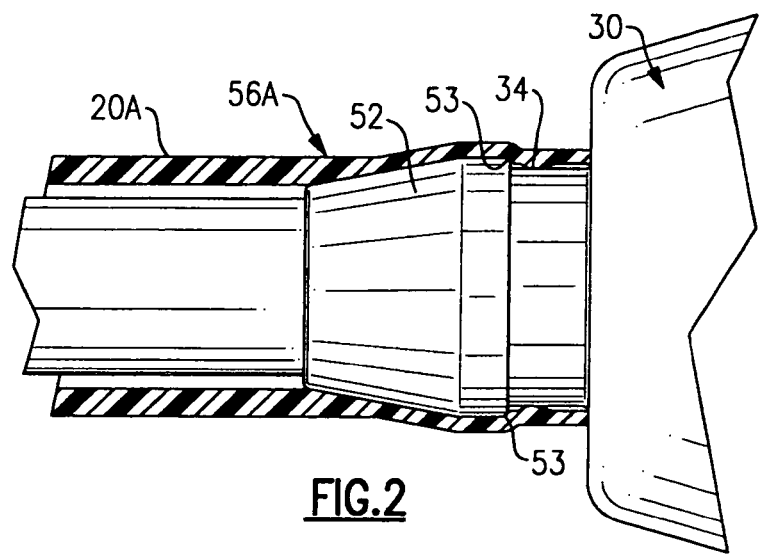
FIG. 2 depicts a partial side sectioned view of a generalized probe cover in accordance with the present invention as attached to a thermometry probe.

A similar probe cover design for an alternative proximal attachment portion 55A is shown in FIG. 2 wherein a retaining rib 34 is also provided for engaging the rear edge 53 of the holding barb 52 of a thermometry apparatus 30 wherein a thinned wall portion enables elastic deformation of the cover in the vicinity of the holding barb to create the desired stored energy upon attachment/engagement.

To initiate ejection, the user applies forward pressure to the ejection member of the probe by depression of the button 60, FIG. 1 provided on the proximal end 56 of the probe 40. As a result, the connected ejection member, as well as the distally connected holding barb 52, are each pushed laterally forward (toward the distal end of the probe). As the holding barb 52 is moved laterally, the rear edge 53 is also moved forward, thereby causing the retaining rib 34 to disengage from the holding barb. This release further creates a release of the stored energy and the probe cover 20 is thrusted forward along the length of the elongate probe 40, thereby pushing the cover clear of the holding barb 52 and enabling the cover to fall from the apparatus 30. In addition, the release further ruptures at least a portion of the weakened wall portion, rendering the probe cover 20 useless. The lubricious and hoop strength properties of the material of the probe cover assist in the ejection process by reducing friction (lubricity) and aiding ejection (hoop strength).

The advantages of the herein described probe cover 20 according to this embodiment are readily apparent. First, the creation of a weakened wall region ensures that the probe cover 20 is rendered useless upon ejection. Therefore, the probe cover 20 cannot be reused, inadvertently or otherwise. Second, the storage of energy within the probe cover 20 of the present embodiment built up during the installation of the cover to the probe due to the thinned wall thickness of the proximal attachment portion 55 ensures that the probe cover 20 can be removed successfully without user intervention, other than that required to initially impart a lateral force on the cover to initiate ejection/removal. The spring force ensures that the cover 20 is successfully ejected without requiring the user to have to overly handle the cover.

As noted by the preceding embodiment, the concept of varying the wall thickness of the probe cover is not limited to the proximal end 28 to aid in the removal of the cover 20 and further to disable the probe cover from re-use. Further enhanced benefits are provided by also reducing the wall thickness at the distal tip 24 relative to the remainder of the probe cover. A reduction in thickness of the distal tip region 59 was first shown in the preceding embodiment. This reduction will now be discussed in greater detail.

Probe covers having different distal tip geometries are herein described according to FIGS. 8 and 13 that embody the inventive concepts described. For purposes of this discussion, the same reference numerals are used for similar parts for the sake of clarity. In addition and for purposes of these embodiments, only the distal tip portion 59 of each cover 20, 120 requires discussion wherein the remainder of the cover may selectively include any or all of the preceding features described herein, such as the proximal attachment portion described above. The distal tip region 59 of each herein described probe cover 20, 120 includes an interior wall thickness that is reduced in thickness relative to the remainder of the cover 20, 120. Each cover 20, 120 is shown as attached to an elongate probe 40 wherein the thinner wall surface permits the cover to be pulled into intimate contact with the distal tip 48 of the probe. Preferably, the wall thickness of the herein described probe cover 20, 120 can be 10 to 40 percent of the remaining wall thickness while still maintaining structural integrity.

Moreover, the thinner wall surface of the distal tip region 59 creates less thermal resistance between the target of interest and the probe and more particularly, the temperature sensitive element as well as the heating element, if a heating element is disposed in the probe. This also reduces the thermal mass of the distal tip area and further allows for better fit conformity in order to prevent air gaps.

According to an alternative embodiment shown in FIG. 14, and rather than reducing the thickness of the entire distal tip, a selected "window" 108 can be provided which is a specifically defined (e.g., located) portion of the distal tip 24 of a probe cover 100 that essentially covers the temperature sensing element of the thermometry probe 40. Preferably, the distal tip 24 of the cover 100 can be fabricated such that the window 108 elastically conforms to the distal tip 48 of the elongate probe 40 at the site of the temperature sensing element. For purposes of ensuring that the temperature sensing element is aligned with the window when a cover is placed thereupon, the window could be arranged circumferentially or alternately a keying feature could be included. The elasticity of the thinned window 108 of the distal tip 24 of the probe 100 cover permits conformance and therefore does not permit the inclusion of an additional air layer which would create further thermal resistance.

According to another embodiment, a probe cover 140 is depicted in FIGS. 11 and 12. As in the preceding, similar parts are herein labeled with the same reference numerals for the sake of clarity. The probe cover 140, like the preceding, is a hollow elongated plastic member sized to be disposed onto the exterior of an elongate thermometry probe 40, shown partially, the probe being identical to those previously described. According to this embodiment, the cover 140 includes at least one feature provided on the axial portion thereof which is not immediately discernible when the cover 140 is manufactured, but which is highlighted upon attachment to the probe 40. Such a feature can include an insertion mark 146, added during the original molding procedure or at a later manufacturing step to the interior wall surface of the probe cover 140, the mark being shown in FIGS. 10 and 11, though it will be readily apparent that other suitable features could be used. An advantage realized by the inclusion of such a feature is that a user is immediately aware a cover has been attached to a probe 40 and therefore the risk of contamination that could be realized by the lack of a cover being present is substantially minimized, if not eliminated. Moreover, the insertion mark 146 provides an advantage as a depth marker for the user in the instance, for example, of rectal probes, in which insertion should be restricted to a predetermined depth. It will be readily apparent that the choice of feature(s) could conceivably include numerous forms other than the one specifically described. For example, the feature could indicate the type of cover used or the manufacturer, among other data. Other similar uses will be readily apparent to one of sufficient skill. In addition, the feature could be provided as a combination of the probe and the probe cover, meaning that a feature could be provided on the probe itself which would not necessarily be discernible to the user until the probe cover has been attached, accenting the feature on attachment.

Figure 9:
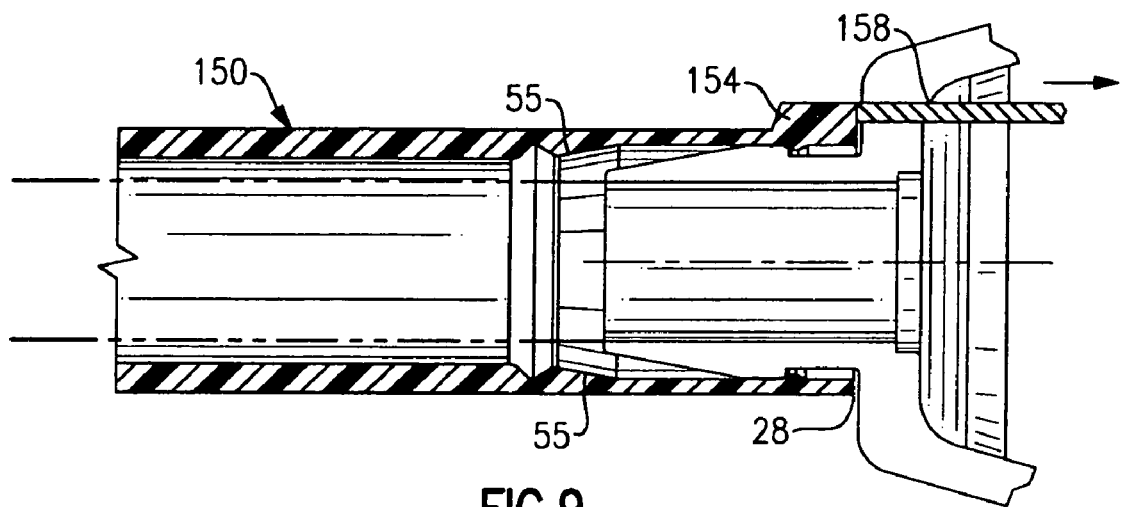
FIG. 9 is a partial side view, partially in section, of a probe cover according to another embodiment of the invention as attached to a thermometry apparatus.
Figure 10:
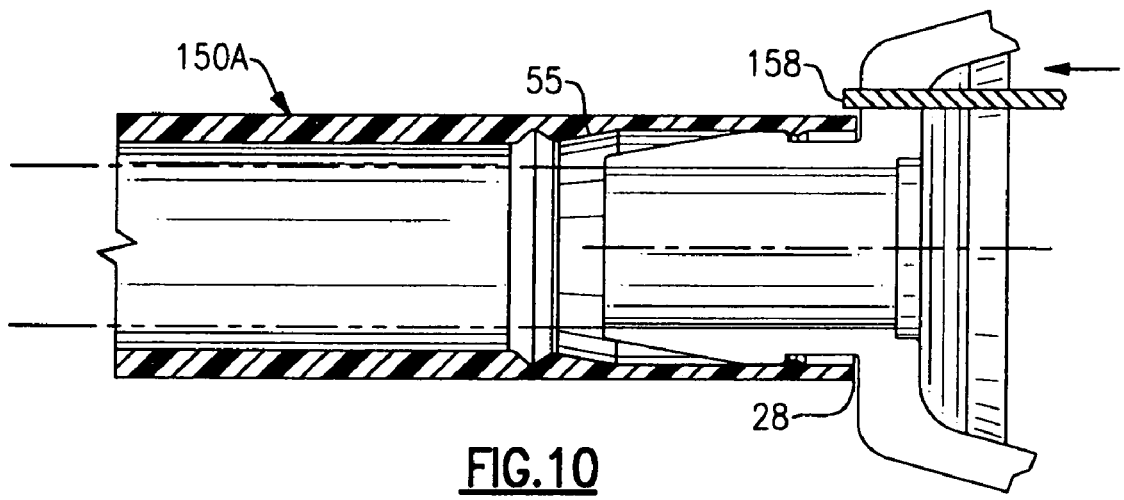
FIG. 10 is the partial side view of the thermometry apparatus of FIG. 9, illustrating the attachment of a separate probe cover.

Referring to FIGS. 9 and 10, there is shown a probe cover in accordance with another preferred embodiment of the invention as well as a thermometry apparatus that is configured for use with the probe cover. As in the preceding, similar parts are herein labeled with the same reference numbers for the sake of clarity. The probe cover 150 according to this embodiment is a hollow elongated member fabricated preferably from a molding process and having a distal tip 24 and an open proximal end 28, the cover preferably being disposable. The cover 180 is sized to be disposed over the exterior of an elongate thermometry probe 40, partially shown, that houses a distally positioned thermal sensing element (not shown). Such features are commonly known in the field and do not in and of themselves form an essential part of the present invention. The output and power cabling from the temperature sensing element extend through the length of the probe 40 to a processor (not shown) residing within a temperature calculating unit to which the probe is tethered, the probe being housed within an isolation chamber or probe well when not in use, such as shown and described with regard to FIG. 1.

As previously noted above, it is possible that temperature coefficients as well as other data can be stored within an EEPROM or other memory device provided at the end of the tethered cable wherein the temperature calculating unit can access stored data from the EEPROM in determining temperature along with necessary algorithms. Further details concerning the storage and calibration of the probe can be found in previously incorporated U.S. Ser. No. 10/683,206.

In lieu of or in combination with using stored data as described above, it is also possible according to the present invention to permit the probe cover to provide an indication of the body site that is being measured. This indication is useful in that different body sites can rely on different processing and/or pre-heating algorithms supplied by either the probe or the temperature calculating unit in order to reliably predict or calculate temperature. According to this embodiment and referring to FIGS. 9 and 10, a pair of probe covers 150 and 150A are shown, wherein the probe cover 150 includes at least one indicator feature 154, preferably disposed on the proximal end 28 thereof, that engages a switch 158 or other indicator on the temperature apparatus 30 when the probe cover is initially attached thereto. The selection of the type of probe cover can therefore be tailored depending on the feature or number of features that are provided to indicate the body site intended for measurement by the user. According to the embodiment shown, the indicator feature includes at least one radially projecting tab portion 154 extending outwardly from the proximal end 28 of the probe cover 150 for engaging a switch provided on the thermometry apparatus 30. The switch or indicator that is provided on the thermometry apparatus 30 is connected to resident circuitry (not shown) in conjunction with a microprocessor (not shown) wherein the apparatus indicator includes at least one axially depending member 158 that is biased outwardly, e.g., toward the distal end 48 of the elongate probe 40.

In operation, the probe cover 150 can be designed for use for measuring a first body site (e.g., the axilla) and the probe cover 150A can be designed for use in measuring a second body site (e.g., the throat) wherein the presence or absence of the radially extending tab in combination with the biased depending member 158 provides an indication of the probe cover type that is attached to the probe.

The indicating feature that has been particularly described is not intended to be overly limiting with regard to the inventive concepts described herein. That is, the number of features that can be provided to indicate the type of cover being used can easily be varied by one of sufficient skill in the field as there are numerous alternatives that accomplish a similar function wherein the features can be varied on the cover as can the switch or other form of indicator that is provided on the thermometry apparatus. For example, the proximal end of the probe cover could include at least one castellation or similar feature that is appropriately sized for engaging an axial tab provided on the temperature measuring apparatus when the cover is initially attached to the probe. Alternatively, the indicating features on the probe cover 150, 150A could be provided within the interior of the probe cover, such as by, for example, an inner side rib, protrusion, recess or other feature.

While the present invention has been particularly shown and described with reference to the preferred mode as illustrated in the drawings, it will be understood by one skilled in the art that various changes in detail may be effected therein without departing from the spirit and scope of the invention as defined by the claims. For example, the probe covers can also be made in different colors to provide an indication of their intended use and or purpose.

PARTS LIST FOR FIGS. 1-14

20 probe cover
20A probe cover
24 distal tip, cover
28 open proximal end, cover
30 thermometry apparatus
34 retaining rib
40 elongate probe
48 distal tip, probe
52 holding barb
53 rear edge
55 proximal attachment portion
55A proximal attachment portion
56 proximal end, probe
59 distal tip region
60 depressible button
64 housing
66 flexible electrical cable
67 isolation chamber
68 user interface
72 front facing side
76 display
77 probe cover source receptacle
80 buttons
100 probe cover
108 window
110 temperature sensing element
120 probe cover
140 probe cover
146 insertion mark
150 probe cover
150A probe cover
154 radially extending tab
158 indicating member-apparatus

We claim:

1. A disposable cover for an elongated probe of a portable thermometry apparatus, said probe including a holding barb at a proximal end thereof, said cover comprising a flexible sleeve member having an open proximal sleeve end and a distal sleeve tip flanking an axial sleeve portion, all sized to fit over at least an axial portion of said elongated probe, said cover including a transitional wall thickness at said proximal sleeve end for fitting over said holding barb of said probe, said transitional wall thickness varying between said axial sleeve portion and a proximal, weakened wall portion that is, in turn, adjacent a further proximal barb-retaining rib, said weakened wall portion being substantially thinner than substantially a majority of said axial sleeve portion and said barb-retaining rib, thereby making said weakened wall portion structurally susceptible to rupture when said cover is ejected from said holding barb in a distal direction.

2. The cover of claim 1, wherein said cover is fabricated from an injection or other molding process.

3. The cover of claim 1, wherein said cover is fabricated from a fusion molding process.

4. The cover of claim 1, wherein ejection of said cover from said probe disables said cover from subsequent reuse thereof.

5. The cover of claim 1, wherein said weakened wall portion is approximately 20 percent of said barb-retaining rib in thickness.

6. The cover of claim 1, wherein an ejection mechanism of said apparatus includes means for supplying an axial force to the proximal end of said cover, wherein said weakened wall portion imparts a spring force to facilitate removal thereof when said axial force is supplied, and in which an inner diameter of said probe cover is sized to be less than a diameter of the holding barb thereby causing radial deformation and rupture of said weakened wall portion when attached thereto.

7. The cover of claim 1, wherein said cover is made from plastic.

8. The cover of claim 1, including a plurality of probe covers and in which certain of said probe covers are color-coded to identify the type of probe cover.

9. The cover of claim 1, wherein at least a portion of said distal tip is defined by a tip wall thickness which is significantly thinner than said axial sleeve portion allowing said distal sleeve tip to conform to a distal end of said elongated probe having a thermal sensing element in said distal end, and enabling said distal sleeve tip to provide a lower resistance thermal conductance path between said probe and an intended target to be measured.

10. The cover of claim 9, wherein said distal sleeve tip includes at least one window portion defined by said tip wall thickness.

11. The cover of claim 10, wherein the entire distal tip is defined by said tip wall thickness, said distal tip including an inner radius, wherein said tip wall thickness permits the distal tip to be sufficiently flexible to conform to the distal end of said elongated probe when said cover is attached thereto.

12. The cover of claim 1, including at least one interior feature disposed within said cover for indicating said cover has been attached to said probe.

13. The cover of claim 12, wherein said at least one feature includes a depth mark indicator.

14. The cover of claim 12, wherein said at least one interior feature is not discernible to a user until said cover has been attached to said probe.

15. The cover of claim 12, wherein said at least one interior feature provides an indication of the type of probe cover being used.

16. The cover of claim 1, including triggering means for triggering detection means disposed on said thermometry apparatus for detecting that said probe cover has been attached thereto.

17. The cover of claim 16, wherein said triggering means includes at least one feature disposed on the interior of said cover.

18. The cover of claim 16, wherein said detection means of said thermometry apparatus includes means for determining whether a particular type of probe cover is attached thereto indicative of the body site to be measured.

19. The cover of claim 16, wherein said triggering means includes at least one feature disposed on the exterior of said cover.

20. The cover of claim 19, wherein said at least one feature is disposed on said proximal sleeve end.

21. The cover of claim 20, wherein said at least one feature includes at least one tab sized for contacting at least one switch member on a said thermometry probe.

22. A thermometry apparatus comprising:
an elongate temperature probe tethered to a housing and having a holding barb disposed at a proximal end thereof;
a disposable probe cover mounted onto the exterior of said elongate probe; and
an ejection mechanism for releasing said disposable probe cover from said elongate probe wherein said cover includes a flexible sleeve member sized to fit over the length of said elongated probe and having a transitional wall thickness in a proximal sleeve end thereof for fitting over said holding barb of said probe, said transitional wall thickness varying between a distal, axial sleeve portion and a proximal, weakened wall portion that is, in turn, adjacent a further proximal barb-retaining rib, said weakened wall portion being thinner than both said barb-retaining rib and substantially a majority of said axial sleeve portion thereby making said weakened wall portion structurally susceptible to rupture and permitting said cover to be more easily removed by said ejection mechanism of said apparatus.

23. The thermometry apparatus of claim 22, wherein said probe cover is fabricated from an injection molding process.

24. The thermometry apparatus of claim 22, wherein said probe cover is fabricated from a fusion molding process.

25. The thermometry apparatus of claim 22, wherein ejection of said probe cover destroys the integrity of the weakened wall portion of said cover.

26. The thermometry apparatus of claim 22, wherein the ejection mechanism includes means for supplying an axial force to the proximal end of said cover, wherein said weakened wall portion imparts a spring force to facilitate removal thereof when said axial force is supplied, and in which an inner diameter of said probe cover is sized to be less than a diameter of the holding barb thereby causing radial deformation of said weakened wall portion when attached thereto.

27. The thermometry apparatus of claim 22, wherein said cover is made from polyethylene.

28. The thermometry apparatus of claim 22, wherein ejection of said probe cover from said probe disables said cover from subsequent reuse thereof.

29. The thermometry apparatus of claim 28, wherein said weakened wall portion has a thickness that is approximately 20 percent of the remainder of said cover.

30. The thermometry apparatus of claim 22, wherein a distal tip of said cover includes a wall portion having a thickness which is less than said axial sleeve portion, thereby facilitating thermal conduction by providing a low resistance thermal path.

31. The thermometry apparatus of claim 30, wherein said distal tip includes at least one window portion made from a thinned portion of material.

32. The thermometry apparatus of claim 31, wherein said wall portion of said distal tip includes an inner radius, said distal tip being sufficiently flexible to be maintained in intimate contact with a distal end of said elongate temperature probe when said cover is attached thereto.

33. The thermometry apparatus of claim 22, wherein said apparatus includes at least one switch and said cover includes means for contacting said at least one switch when said cover is attached to said elongate probe.

34. The thermometry apparatus of claim 33, wherein said switch contacting means includes at least one tab provided at a proximal end of said cover.

35. The thermometry apparatus of claim 33, wherein said switch contacting means includes at least one feature provided on the exterior of a proximal end of said cover.

36. The thermometry apparatus of claim 33, including means connected to said at least one switch for determining the type of probe cover attached to said apparatus.

37. The thermometry apparatus of claim 36, including means for setting at least one performance mode of said thermometry apparatus depending on the type of probe cover determined.

38. A disposable cover for an elongated probe of a portable thermometry apparatus, said probe including a holding barb at a proximal end thereof, said cover comprising:
  a flexible sleeve member having an open proximal sleeve end and a distal sleeve tip flanking an axial sleeve portion, all sized to fit over at least an axial portion of said elongated probe, said cover including a transitional wall thickness at said proximal sleeve end for fitting over said holding barb of said probe, said transitional wall thickness varying between said axial sleeve portion and a proximal, weakened wall portion that is, in turn, adjacent a further proximal barb-retaining rib, said weakened wall portion further being substantially thinner than substantially a majority of said axial sleeve portion and said barb-retaining rib, thereby making said weakened wall portion structurally susceptible to rupture when said cover is ejected from said holding barb by an ejection mechanism of said thermometry apparatus wherein the ejection mechanism of said apparatus includes means for supplying an axial force to the proximal end of said cover, wherein said weakened wall portion imparts a spring force to facilitate removal thereof when said axial force is supplied, and in which an inner diameter of said probe cover is sized to be less than a diameter of the holding barb thereby causing radial deformation of said weakened wall portion when attached thereto.

* * * * *